United States Patent [19]
Stockton

[11] 3,985,044
[45] Oct. 12, 1976

[54] FOUR SPEED MANUAL TRANSMISSION WITH CONCENTRIC INPUT AND OUTPUT SHAFTS

[75] Inventor: Thomas R. Stockton, Ann Arbor, Mich.

[73] Assignee: Ford Motor Company, Dearborn, Mich.

[22] Filed: Dec. 19, 1974

[21] Appl. No.: 534,516

[52] U.S. Cl............................ 74/710.5; 74/15.88
[51] Int. Cl.²........................................ F16H 1/38
[58] Field of Search............... 74/710.5, 711, 713, 74/714, 715, 331, 356, 710, 15.86, 15.88

[56] References Cited
UNITED STATES PATENTS

| | | | |
|---|---|---|---|
| 2,962,916 | 12/1960 | Koelsch | 74/710.5 |
| 3,439,786 | 4/1969 | Schmid | 74/710.5 X |
| 3,517,572 | 6/1970 | Schmid | 74/710.5 |
| 3,589,483 | 6/1971 | Smith | 74/331 X |
| 3,614,902 | 10/1971 | Candellero | 74/730 X |
| 3,845,671 | 11/1974 | Sharp et al. | 74/710.5 |

FOREIGN PATENTS OR APPLICATIONS 120,504  12/1943  Australia............................ 74/710.5

*Primary Examiner*—Samuel Scott
*Assistant Examiner*—Wesley S. Ratliff, Jr.
*Attorney, Agent, or Firm*—Donald J. Harrington; Keith L. Zerschling

[57] ABSTRACT

A manual transmission for an automotive vehicle driveline having four forward driving ratios with torque transmitting gear elements mounted on countershafts arranged in radial disposition and in parallel relationship with respect to a power input shaft, a power output shaft concentrically disposed in the power input shaft whereby the overall axial dimensions of the transmission mechanism are reduced and the gear loads are isolated to reduce deflection and to permit the use of relatively fine pitch gearing and wherein provision is made for mounting the differential gearing within the transmission assembly and for braking the transmission output shafts at a location adjacent the differential side gears.

8 Claims, 2 Drawing Figures

FOUR SPEED MANUAL TRANSMISSION WITH CONCENTRIC INPUT AND OUTPUT SHAFTS

GENERAL DESCRIPTION OF THE INVENTION

The improved transmission structure of my invention is adapted especially to be used in a driveline for a small road vehicle with an engine and transmission assembly mounted with their axes mounted transversely with respect to the vehicle centerline. Unlike conventional transmission mechanisms that have their input shaft at the opposite end, my improved transmission has an input shaft arranged concentrically with respect to one of a pair of axle shafts. Torque is delivered from the gearing to a differential mechanism located within the transmission assembly to each output shaft, and universal joints are used to transmit torque to the outboard driveshafts associated with the vehicle traction wheels.

The clutch structure for connecting the engine crankshaft to the input element of the gearing is manually operated and the clutch throw-out bearing, which usually is mounted on a sleeve shaft connected to the housing, is slidably mounted instead on an input shaft connected to torque input gears disposed concentrically about the axis of the input shaft. Each input gear engages a cluster gear element which is mounted in two separate assemblies associated with two radially spaced countershafts. Each countershaft has an output gear element that meshes with the drive gear for the differential mechanism.

The double countershaft gearing arrangement and the integrated differential mechanism provides maximum space economy in a driveline for small vehicles and permits transverse disposition of the engine and transmission assembly in the powertrain compartment of the vehicle. Axial thrust forces and radial gear loads are transmitted directly through strategically positioned bearings to the transmission housing so that a minimum degree of deflection is present. A common lubrication system is used for the clutch and transmission.

PARTICULAR DESCRIPTION OF THE INVENTION

Figure 1A:
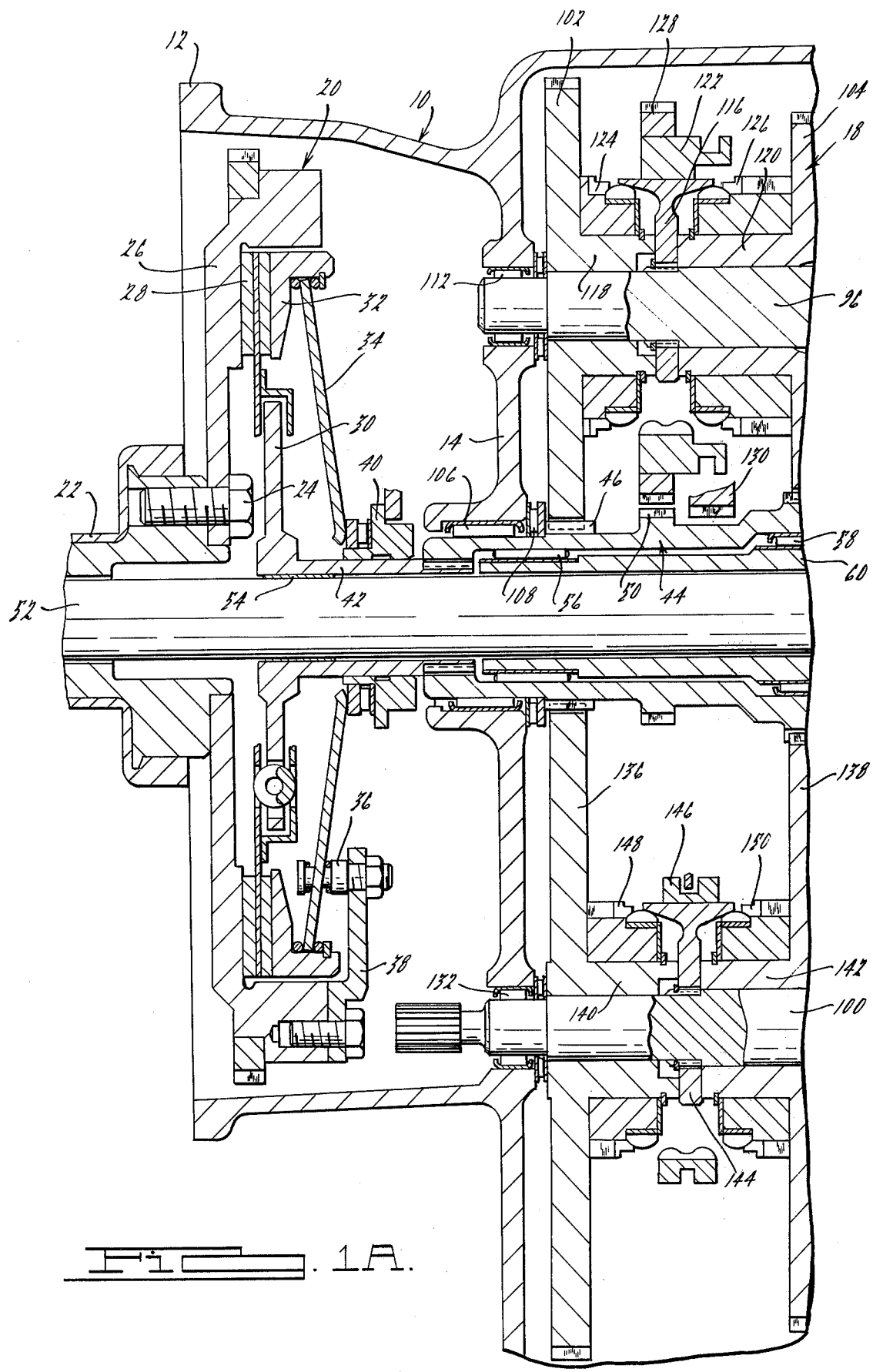
FIGS. 1A and 1B of the drawings show a cross sectional assembly view of an assembly that includes the countershaft gearing, the clutch and the differential mechanism of my improved transmission. The plane of the cross section of the view is transversely disposed with respect to the vehicle centerline.
Figure 1B:
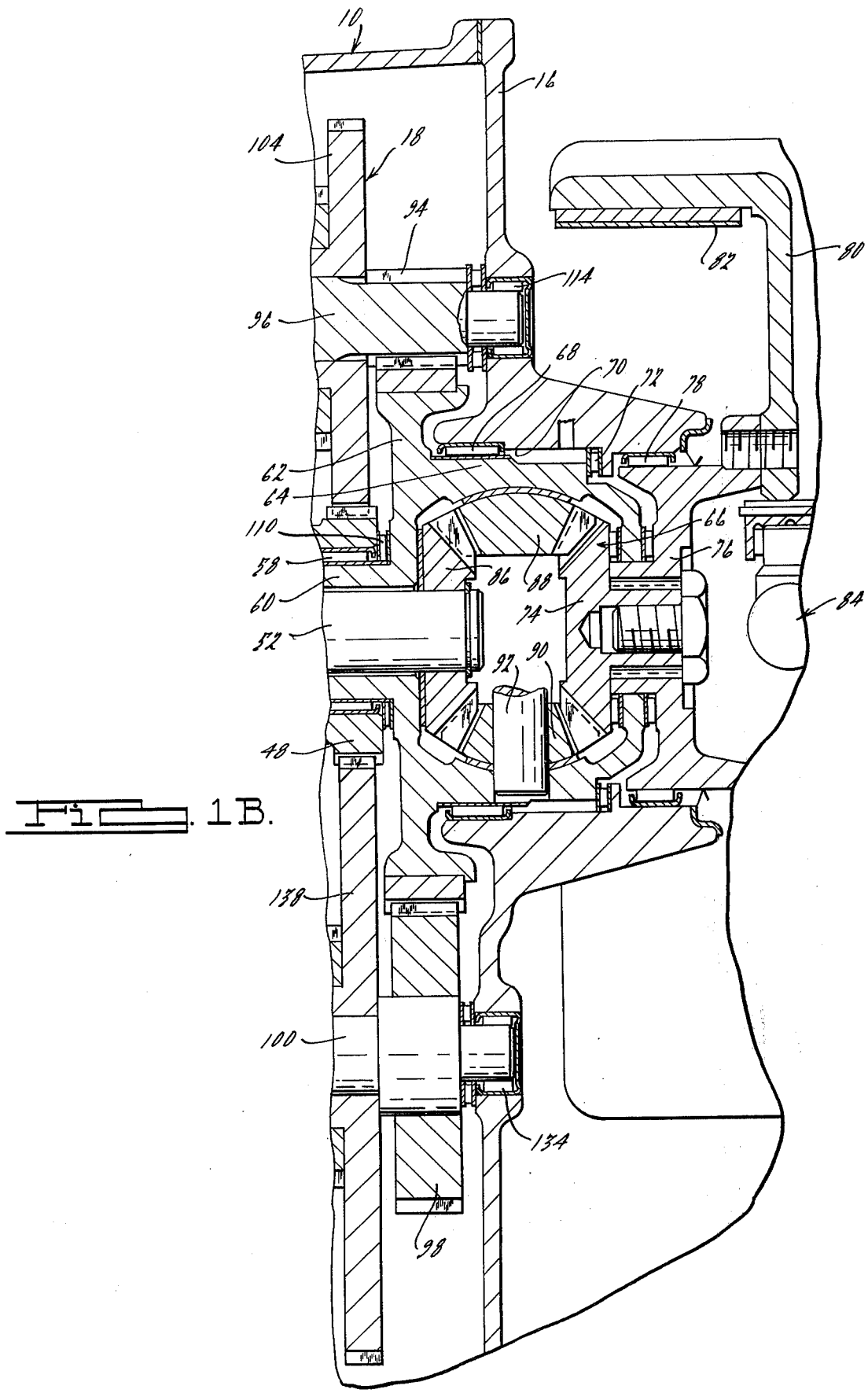

Numeral 10 designates generally in FIGS. 1A and 1B a transmission housing. It is adapted to be bolted at its left-hand margin 12 to the engine block of an internal combustion engine. It includes an intermediate bearing support wall 14 and an end wall 16. Wall 14 separates the torque transmitting gearing shown generally at 18 from the clutch structure shown generally at 20 and cooperates with the housing 10 to define two separate chambers for receiving the gearing 18 and clutch 20.

The engine crankshaft is shown partially at 22 in FIG. 1A. It is bolted by bolts 24 to the engine flywheel 26. A clutch plate 28 carried by a clutch disc hub 30 is situated between the friction surface of the flywheel 26 and clutch pressure plate 32. A clutch actuator spring 34, which is pivoted on pivot studs 36, applies a clutch engaging force to the pressure plate 32. The studs 36 are carried by a radially disposed bracket 38, which in turn is carried by the margin of the flywheel 26. The clutch throw-out bearing 40 is mounted slidably on sleeve shaft 42, which in turn is secured to the hub 30 of the clutch plate. Movement of the throw-out bearing 40 in a left-hand direction will shift the inner margin of the actuating spring 34 thereby releasing the clutch. Suitable clutch linkage mechanisms can be used to actuate the throw-out bearing 40 although it is not shown in the drawing. The sleeve shaft 42 is splined to a cluster gear assembly 44 which has formed thereon a first input gear 46, a second input gear 48 and a reverse drive input gear 50. Sleeve shaft 42 is journalled on output shaft 52 by means of bushing 54. The shaft 52 extending concentrically through the sleeve 42 and through the crankshaft 22. Cluster gear 44 is journalled by spaced needle bearing assembly 56 and 58 on sleeve shaft extension 60 of output gear 62, the latter being carried by differential case 64 for a differential gear assembly 66 as seen in FIG. 1B. The case 64 is journalled by bushing 68 in bearing opening 70 formed in end wall 16. Thrust forces on the case 64 are transmitted to the wall 16 through radial needle thrust bearing assembly 72.

Differential assembly 66 comprises a side gear 74 which is splined to brake drum hub 76. The housing wall 16 has an opening that receives hub 76 and journals it for rotation by means of bearing 78. Brake drum 80 is carried by hub 76. Its periphery registers with brake band 82 which is adopted to expand into friction engagement with the drum 80 to effect braking the vehicle. Hub 76 is adapted to be connected to the input drive element of the universal joint shown generally at 84. The output element of the joint 84 is connected to one of the driveshafts for traction wheels. Brake drum forces are transmitted directly to the housing through bearing 78 rather than to the side gear 74 or to any other torque transmitting shaft. Deflection and unbalanced radial loads due to the brake forces on the drum 80 thus are eliminated.

The other side gear 86 is carried at the inboard end of the output shaft 52 within the differential case 64. Side gears 74 and 86 engage differential pinions 88 and 90 mounted for rotation on pinion shafts, one of which is shown at 92. The pinion shafts in turn are mounted in shaft openings formed in the case 64.

A drive gear 94 formed on or carried by a first countershaft 96 engages the output gear 62. Similarly, another drive gear 98 carried by a second countershaft 100 drivably engages the output gear 62. Gear 98 is effective during operation in the third and fourth ratios, as will be explained subsequently, and the gear 94 is effective during operation in the first and second speed ratios as well as in reverse.

Countershaft 96 carries a first speed ratio gear 102 and a second speed ratio gear 104. These mesh respectively with the input gear 46 and the input gear 48. Gears 46 and 48 are journalled, as mentioned previously, by bearings 56 and 58 as well as by bearing 106 located in a bearing opening formed in the support wall 14. Thrust forces on the input gears are transmitted directly to the housing by radial needle thrust bearing assemblies 108 and 110, the latter transmitting thrust forces to the case 64 which in turn transmits the forces through thrust bearing 72 to housing wall 16. Shaft 96 is journalled at its ends by bearings 112 and 114 in openings formed in the wall 14 and wall 16 respectively. Countershaft 96 is connected directly to transmission synchronizer clutch hub 116. Gear 102 is formed integrally with the hub 118 which in turn is journalled on countershaft 96. Similarly, gear 18 is formed with the hub 120 which is journalled on countershaft 96 on the right-hand side of the hub 116. Synchronizer clutch lead 122 which has internal clutch teeth is adapted to engage clutch teeth 124 formed on the gear 102 when the sleeve 122 is shifted in a left-hand direction. When it is shifted in a right-hand direction, the clutch teeth and the sleeve 122 engage clutch teeth 126 carried by the gear 104. In this way gear 102 and gear 104 can be clutched directly to the shaft 96. When the sleeve 122 is positioned as shown both gears 102 and 104 are adapted to freewheel on countershaft 96.

Synchronizer clutch sleeve 122 carries a reverse gear 128. The reverse idler gear 130 is adapted to engage the reverse gear 50 and the reverse gear 128 when it is shifted in a left-hand direction from the position shown in the drawing. When it is positioned as shown, no torque is transmitted between the gears 50 and 128. A suitable shiftfork, not shown, is used to effect shifting movement of the sleeve 122 in either one direction or the other during reverse drive operation. The sleeve 122 is located in the neutral position illustrated in the drawing.

The countershaft 100 is journaled at its ends by means of bearings 132 and 134 located respectively in bearing openings formed in walls 14 and 16 of the housing. Gear 98 is carried by countershaft 100 at a location adjacent wall 16. A third speed ratio gear 136 and a fourth speed ratio gear 138 are journalled on the countershaft 100. Each is formed with a hub, as shown at 140 and 142 respectively, which are located on either side of a synchronizer clutch hub 144. Countershaft 100 is keyed or splined directly to hub 144. The hubs 140 and 142 are journalled rotatably on the countershaft 100 which may be clutched to the countershaft 100 in driving relationship by means of a synchronizer clutch sleeve 146 which has internal clutch teeth adapted to engage synchronizer clutch teeth 148 and 150. Gear 136 carries the teeth 148 and gear 138 carries the teeth 150. By means of the synchronizer clutch sleeve the gears 136 and 138 may be conditioned for torque delivery selectively. A suitable shiftfork, not shown, is used to shift the clutch sleeve 146.

The telescopic relationship between the differential case and the gearing assembly permits transfer of output gear loads directly to the case without causing shaft deflection. The short countershaft, in contrast to conventional longer countershafts found in most manual transmissions of known construction, make it possible to reduce substantially the axial length of the transmission mechanism while reducing deflections caused by gear loads on the gears carried by the countershaft. The inboard brake assembly makes it unnecessary to use outboard brakes on each traction wheel since braking effort applied to the drum will cause braking of each output shaft by reason of the differential action of the differential assembly. This braking effort is accomplished without introducing unbalanced braking loads on torque transmitting elements of the transmission mechanism.

Having thus described a preferred embodiment of my invention what I claim and desire to secure by U.S. Letters Patent is:

1. A power transmission mechanism having manually controlled gear elements for use in an automotive vehicle driveline comprising a power input shaft and a power output shaft concentrically disposed one within the other in a transmission housing, clutch means for connecting the input shaft to an engine crankshaft, input gears connected to the input shaft in coaxial disposition with respect to the output shaft, a pair of countershafts arranged in spaced parallel disposition with respect to the input shaft, torque transmitting drive gears journalled on each countershaft in drive relationship with respect to said input gears, one end of each countershaft having formed thereon an output drive gear, a differential mechanism having a pair of differential side gears and differential pinions driveably connecting the side gears, one side gear being connected to said output shaft, said output shaft and the other side gear being adapted to be connected to driven portions of said mechanism, an output gear carried by said differential mechanism in meshing engagement with said output drive gears, synchronizer clutch means for connecting selectively each of said drive gears to its respective countershaft, said drive gears being in meshing engagement with said input gears.

2. The combination set forth in claim 1 wherein each countershaft has journalled thereon two drive gears of different pitch diameter, one drive gear of each countershaft engaging a first input gear, a second drive gear of each countershaft engaging a second input gear, a reverse gear carried by one of said countershafts, one of said input gears being a reverse drive gear, a reverse drive pinion adapted to move axially into meshing engagement with said reverse drive gear and a reverse drive input gear converted to said input shaft to effect reverse drive operation as the other drive gears are disengaged.

3. The combination set forth in claim 1 wherein said differential assembly comprises a case located directly adjacent said gearing, said output gear being carried by said case, the transmission housing means enclosing said gears, said housing providing bearing supports for the ends of said countershafts, said case being journalled in said housing adjacent said output gear.

4. The combination set forth in claim 2 wherein said differential assembly comprises a case located directly adjacent said gearing, said output gear being carried by said case, the transmission housing means enclosing said gears, said housing providing bearing supports for the ends of said countershafts, said case being journalled in said housing adjacent said output gear.

5. The combination set forth in claim 1 wherein said differential mechanism comprises a brake drum hub connected to one side gear, a transmission housing extension receiving said brake drum hub, said hub being journalled in said housing whereby brake forces on said drum are transmitted directly to said housing thereby effecting braking action of said vehicle.

6. The combination set forth in claim 2 wherein said differential mechanism comprises a brake drum hub connected to one side gear, a transmission housing extension receiving said brake drum hub, said hub being journalled in said housing whereby brake forces on said drum are transmitted directly to said housing thereby effecting braking action of said vehicle.

7. The combination set forth in claim 3 wherein said differential mechanism comprises a brake drum hub connected to one side gear, a transmission housing extension receiving said braake drum hub, said hub being journalled in said housing whereby brake forces on said drum are transmitted directly to said housing thereby effecting braking action of said vehicle.

8. The combination set forth in clam 4 wherein said differential mechanism comprises a brake drum hub connected to one side gear, a transmission housing extension receiving said brake drum hub, said hub being journalled in said housing whereby brake forces on said drum are transmitted directly to said housing thereby effecting braking action of said vehicle.

* * * * *